(No Model.)
J. W. LANGFORD & W. M. WASHBURN.
FISH OR MOLE TRAP.
No. 545,960. Patented Sept. 10, 1895.
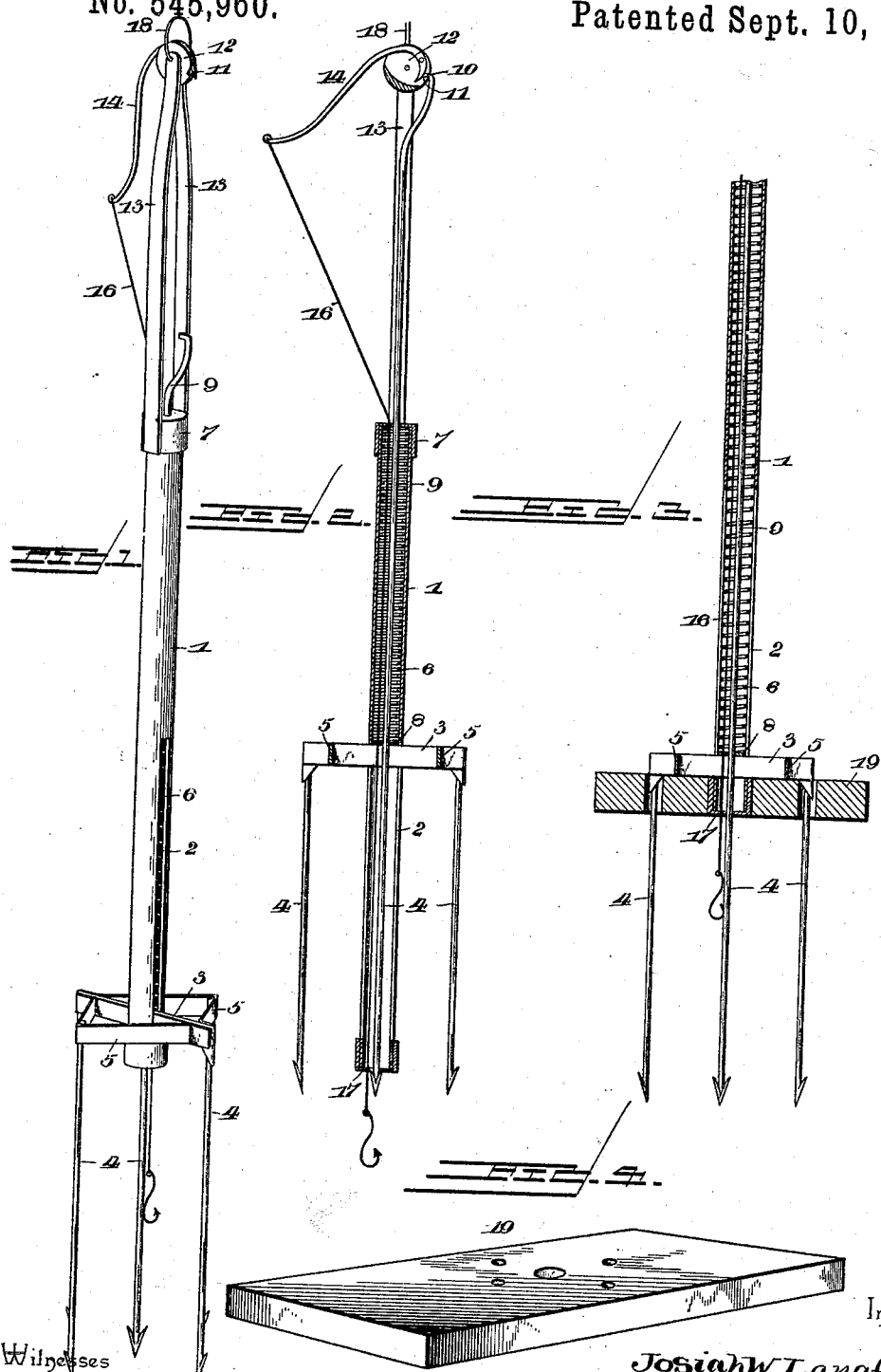

UNITED STATES PATENT OFFICE.

JOSIAH WALTER LANGFORD AND WILLIAM M. WASHBURN, OF GIBSLAND, LOUISIANA.

FISH OR MOLE TRAP.

SPECIFICATION forming part of Letters Patent No. 545,960, dated September 10, 1895.

Application filed July 13, 1895. Serial No. 555,870. (No model.)

*To all whom it may concern:*

Be it known that we, JOSIAH WALTER LANGFORD and WILLIAM MICON WASHBURN, citizens of the United States, residing at Gibsland, in the parish of Bienville and State of Louisiana, have invented a new and useful Fish or Mole Trap, of which the following is a specification.

The invention relates to improvements in fish and mole traps.

The object of the present invention is to improve the construction of traps, and to provide a simple and inexpensive one, which will be exceedingly sensitive, and which will be adapted for catching fish, moles, and other animals.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention and shown arranged for fishing. Fig. 2 is a central longitudinal sectional view of the same, the trap being set. Fig. 3 is a sectional view of the lower portion of the trap, showing the same arranged for catching moles. Fig. 4 is a detail view of the removable base.

Like numerals of reference indicate corresponding parts in all the figures of the drawings.

1 designates a tube provided in its lower portion with a longitudinal slot 2, extending through both sides of the tube and receiving the transverse bar 3, and the latter is adapted to carry one or more spears 4, which are provided with arrow-headed points, and which are adapted to impale a fish, mole, or the like. The spears may be of any desired number and are preferably arranged, as illustrated in the accompanying drawings, with one at each end of the transverse bar, and the central one extending within the lower end of the tube, and spear-supporting pieces 5 are secured at opposite sides of the transverse bar, and are offset from the tube, and may be provided with one or more spears. These spear-supports 5 may be angular, as shown, or curved, or of any other desired configuration, and they enable the desired number of spears to be provided.

When the trap is set by the means hereinafter described, the transverse bar is drawn upward along the tube 1 against the action of a spiral spring 6, which is interposed between the cross-bar and a nut 7 at the top of the tube, and the cross-bar 3 is provided with a disk 8, forming a seat or support for the lower end of the spring. The nut or cap 7 screws on the upper end of the tube, which is threaded for its reception, and it is provided with a central perforation, receiving a stem 9, preferably formed integral with the central spear of the transverse bar, and having its upper end curved and shaped to form a tooth 10 for engaging a shoulder 11 of a casing or support 12. The casing or support 12 is located above the upper end of the tube and is preferably circular, and it is secured between the upper ends of bars 13, which have their lower ends attached to the nut or cap 7. The shoulder 11 is preferably formed by a notch cut in the periphery of the casing. The transverse bar is forced backward against the action of the spring, which is compressed, and the upper end of the stem is engaged with the shoulder of the casing to set the trap. The trap is sprung by a cam-lever 14, pivoted within the casing 12 and provided with a projection located adjacent to the notch or shoulder 11 and arranged to swing outward to disengage the stem from the shoulder. The lever extends downward at a slight angle to the bars 13, and connected with its lower end is a bait-receiving wire 16, which extends through the tube and is provided at its lower end with a hook or other bait-receiving device. The lower end of the tube is provided with a perforated plate 17, forming a guide for the bait-wire.

The casing is provided with a ring 18, to which may be connected a line when the trap is used for fishing; but when the trap is employed for impaling moles a removable base 19 is employed. The base 19 is preferably rectangular and is provided with a central opening for the reception of the lower end of the tube and has perforations to receive the spears.

It will be seen that the trap is exceedingly simple and inexpensive in construction, that it is exceedingly sensitive, and that it may be readily changed from a mole to a fish trap.

Changes in the form, proportion, and the minor details of construction may be resorted to without departing from the principle or sacrificing any of the advantages of this invention.

What we claim is—

1. In a trap, the combination of a tube, a spring arranged within the tube, a stem connected with and actuated by the spring and provided at its upper end with a tooth or projection, a spear connected with the lower end of the stem, a casing arranged above the tube and connected with the same and provided with a shoulder to be engaged by the stem, a lever fulcrumed on the casing and provided with a projection located adjacent to the shoulder and adapted to swing outward to disengage the stem, and means for operating the lever, substantially as described.

2. In a trap, the combination of a tube, provided with a longitudinal slot, a transverse bar passing through the slot and designed to carry spears, a spring arranged within the tube and engaging the transverse bar, a casing connected with the top of the tube and provided with a shoulder, a stem connected with the transverse bar and having at its upper end a tooth or projection for engaging the shoulder, a lever fulcrumed on the casing and provided with a projection arranged adjacent to the shoulder to disengage the stem, and a bait receiving device connected with the lever, substantially as and for the purpose described.

3. In a trap, the combinatian of a tube, provided with a longitudinal slot, a transverse bar passing through the slot, a spiral spring arranged within the tube and engaging a transverse bar, the supporting bars extending from the tube, a casing secured to the supporting bar and provided with a shoulder, a stem connected with the transverse bar and engaging the shoulder of the casing, a lever fulcrumed on the casing and provided with a projection for releasing the stem, and opposite spear supports carried by the transverse bar, substantially as described.

4. In a trap, the combination of a tube, a transverse bar provided with spears, a removable base having an opening to receive the lower end of the tube and provided with perforations for the spears, a spring for actuating the transverse bar, and setting and tripping devices, substantially as described.

In testimony that we claim the foregoing as our own we have hereto affixed our signatures in the presence of two witnesses.

JOSIAH WALTER LANGFORD.
WILLIAM M. WASHBURN.

Witnesses:
W. M. WASHBURN, Jr.,
JNO. A. RICHARDSON.